INVENTOR.
LEON J. URBEN
BY J. Shore
ATTORNEY

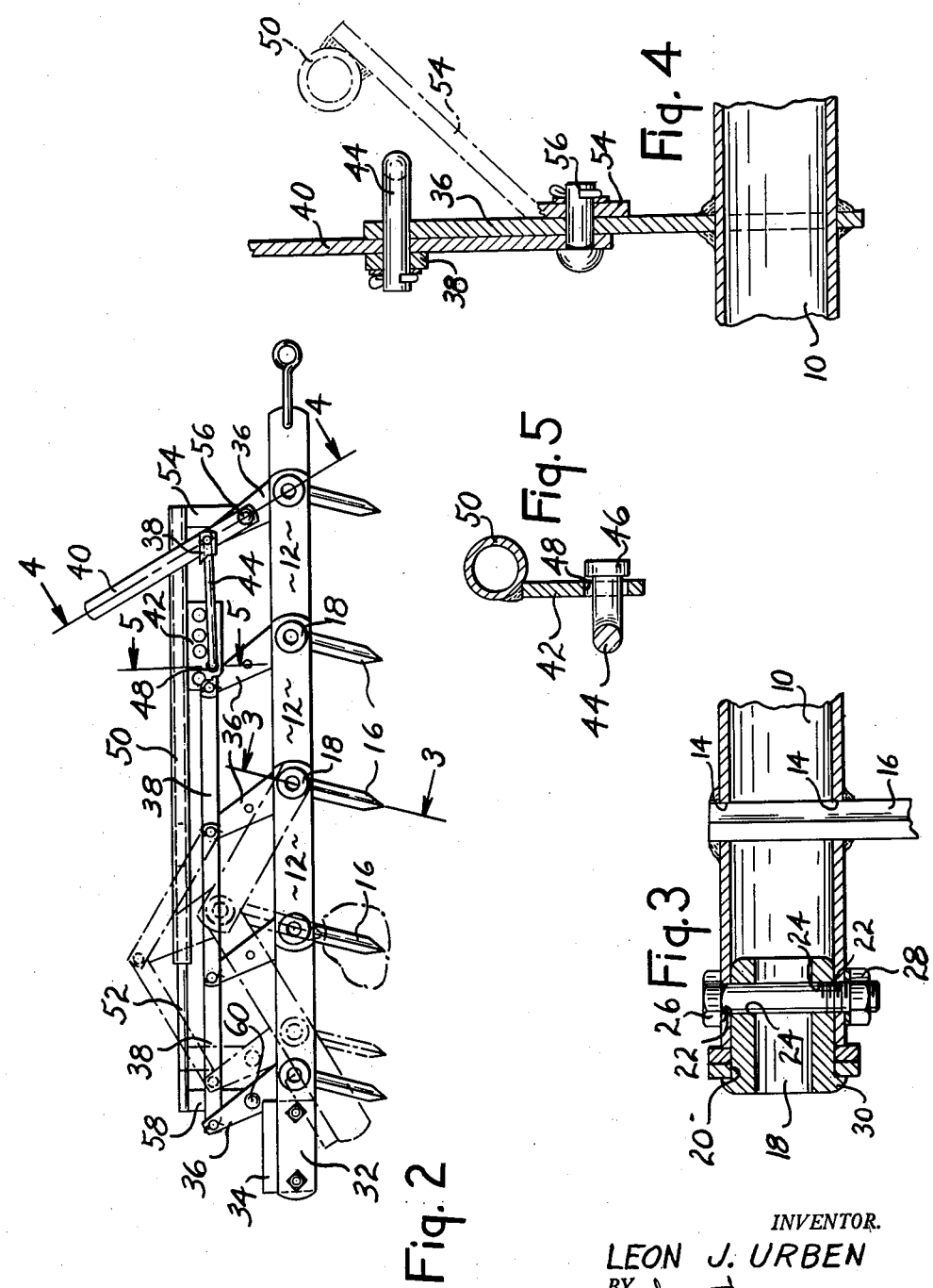

United States Patent Office 3,043,377
Patented July 10, 1962

3,043,377
SPIKE TOOTH HARROW
Leon J. Urben, Loves Park, Ill., assignor to J. I. Case Company, Racine, Wis., a corporation of Wisconsin
Filed Nov. 18, 1959, Ser. No. 853,959
10 Claims. (Cl. 172—611)

This invention relates to a spike tooth harrow, and more particularly to a spike tooth harrow adapted for use on rough or trash-covered ground.

Spike tooth harrows usually fall into three general types; they are the rigid harrow, the flexible harrow, and the semi-rigid harrow.

The rigid harrow, such as shown in U.S. Patent 2,005,044 issued to F. H. Muntzel, performs satisfactorily on relatively smooth terrain but becomes inefficient when uneven ground is encountered. This is due to its inability to float and follow the changing contours of uneven terrain. Also, when working in stony or trash-covered ground, the entire harrow may be elevated out of a working position if one of the tooth bars strikes an obstruction.

The conventional flexible harrow, such as shown in U.S. Patent 2,347,979 issued to V. Antal, was developed for use in problem terrain and has the ability to follow the contours of the ground and to ride over obstructions. Unfortunately, there are certain disadvantages to this type of harrow; namely, it is very difficult to counterweight the harrow to react against the forces which tend to push the harrow out of a working position when working in adverse ground conditions.

The semi-rigid harrow, such as shown in U.S. Patent 2,704,920 issued to J. H. Fulper, was developed to incorporate the desirable characteristics of the flexible and rigid harrows. This type of harrow derives its name from the fact that it maintains the harrow teeth in parallelism as the rigid harrow and is still able to float and follow the contours of the terrain as a flexible harrow. However, there are certain inherent problems with this type of construction. It will be seen in the Fulper patent that the flexing of the harrow is accomplished by placing a high stress on the structural elements of the harrow. This stress is caused by the presence of a rigidifying member which tends to fix the distance between the first and last tooth bar. However, this distance must change upon displacement of any tooth bar out of its normal position, and such change can only take place with accompanying straining or springing of the rigidifying member, the tooth bars, or both. Other attempts have been made to provide flexibility in semi-rigid harrows, such as utilizing lost motion slots or loose joints in structural members. The latter arrangement, as in the case of the Fulper patent, limits the flexibility of the harrow and any additional flexing required places a high stress on the harrow parts.

Accordingly, it is an object of the present invention to provide an adjustable, spike tooth harrow, which has the advantage of a fully flexible harrow, in which each of the individual tooth bars can move out of alignment with its adjacent tooth bar; while providing the advantages of a rigid harrow in which the teeth of the first and last tooth bars are maintained in a predetermined substantially fixed geometric relationship or angle relative to the ground without severely stressing the structural elements of the harrow.

Other objects and advantages will become apparent from the following description taken in conjunction with the accompanying drawings in which:

FIG. 2 is a side view of the harrow and illustrates, in dot-dash lines, the position of the harrow when an intermediate tooth bar encounters an obstruction tending to move it out of alignment with the adjacent tooth bars;

FIG. 3 is a partial sectional view taken along lines 3—3 of FIG. 2;

FIG. 4 is a sectional view taken along line 4—4 of FIG. 2; and

FIG. 5 is a partial sectional view taken along line 5—5 of FIG. 2.

Figure 1:
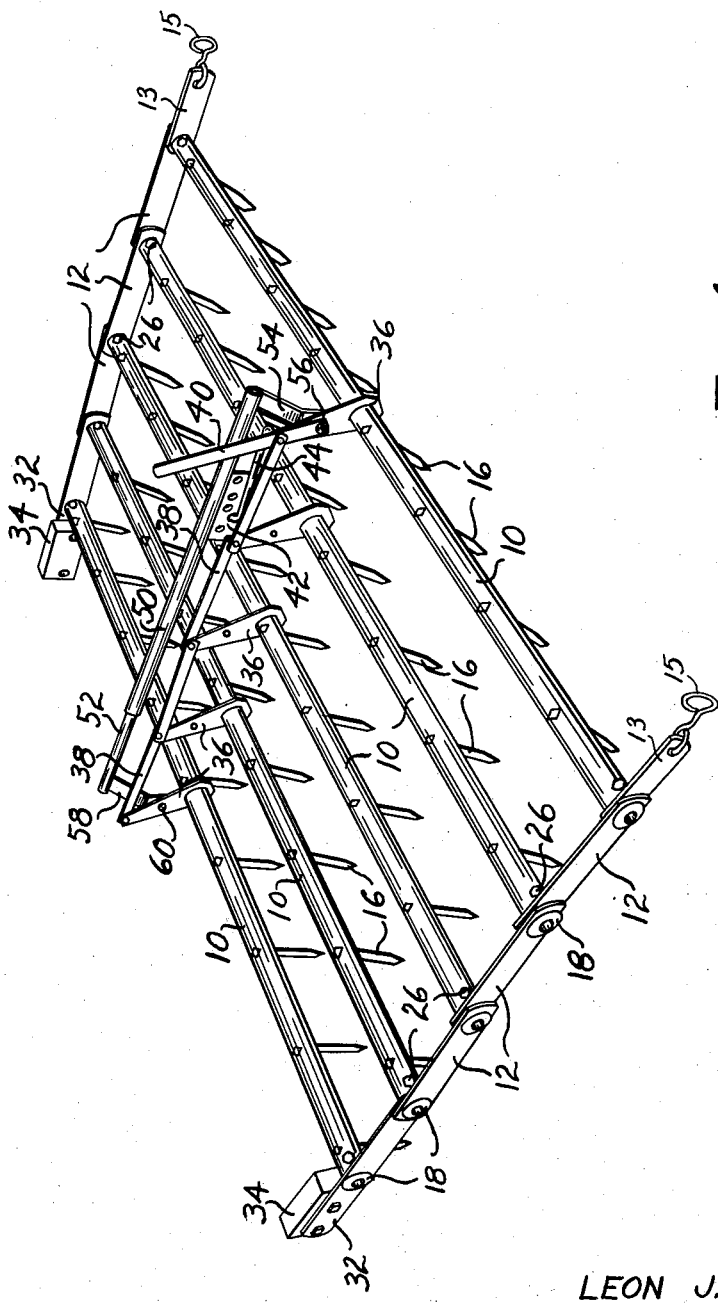
FIG. 1 is a perspective view of the harrow embodying the invention.

Generally stated, applicant's invention relates to a spike tooth harrow in which the individual spike tooth bars are free to move out of alignment with or float relatively to adjacent tooth bars to avoid damage from rocks or other impediments, and to follow uneven contoured ground while maintaining a predetermined fixed geometric relationship or angle relative to the ground and each other between the foremost and rearmost tooth bars. Thus, the parallelism of the harrow teeth is retained and a counteraction force can be applied to maintain the entire harrow in a ground-engaging position to remove the usual tendency of the rear tooth bar to ride out of the ground Referring now to FIG. 1, it is noted that the harrow illustrated comprises a plurality of parallel tooth bars 10, which are connected together at their ends by links 12. As can be seen by referring to FIG. 3, the tooth bars 10 are of a tubular construction and define openings through which the teeth 16 extend. Teeth 16 are secured as by welding to tooth bars 10.

Side links 12 are maintained in a pivotal relationship with tooth bars 10 by flanged trunnions 18. The trunnions 18 are cylindrical and they extend through openings 20, FIG. 3, in overlapping side links 12 and into the ends of bars 10. The end portions of the tubular tooth bars 10 and the trunnions 18 define aligned openings 22 and 24 respectively through which extend bolts 26 and nuts 28 for securing trunnions 18 to tooth bars 10. Connecting links 13 and draft links 15 are pivotally connected to the foremost tooth bar 10 and are provided with means to suitably draft connect the harrow to a conventional draft mechanism of a prime mover (not shown). It can be appreciated that the links 12 are free to rotate relatively to the trunnion 18 but are restricted from moving laterally by tooth bar 10 and flanged portion 30 of trunnion 18. The rearmost links 12 include extensions 32 on which are located weights 34. It is sufficient to note at this time that the weights 34 tend to prevent the rear of the harrow from rising out of the ground by serving as a counterweight against the reaction forces set up by the ground being harrowed and which form, with the drawbar pull, a couple tending to rock the foremost tooth bar 10 clockwise as seen in FIGS. 1 and 2, and thereby to raise the rear tooth bar 10.

Referring now to FIG. 2, it is noted that the tooth bars 10 have secured thereto upstanding rocker arms 36 which are connected at their upper ends to links 38. Links 38 are interconnected to form an articulated linkage between the foremost and rearmost tooth bars.

The arms 36 are rigidly secured at their lower ends to their respective tooth bars as by welding. Thus it can be seen, that upon adjustment of one of the rocker arms 36, each of the tooth bars 10 will be adjusted simultaneously with the others to change the position of teeth 16 with relation to the ground. To readily accomplish the simultaneous adjustment of the tooth bars 10, there is an upwardly extending handle 40 rigidly secured to the foremost tooth bar, in the present instance through the foremost rocker arm 36.

As clearly seen in FIG. 2, the tooth bars 10 and their teeth 16 are locked in position relative to the ground by a locking assembly consisting of an apertured plate 42 and a tension link 44. The forward end of link 44 is pivotally secured to the foremost arm 36, and the rear end of the link 44 contains a locking portion 46 that extends through an opening 48 in the plate 42. The locking plate 42 is secured to a tube 50 as by welding. The position of the bars can be varied by rocking of handle 40 with locking portion 46 removed from plate 42, and the new adjustment secured by placing link 44 in one of the other holes in plate 42. Locking portion 46 can be removed from plate 42 to permit relocating of link 44, portion 46 being slightly smaller than the holes, as clearly shown in FIG. 5.

The foregoing description relates generally to a flexible spike tooth harrow of the type disclosed by Antal Patent No. 2,347,979 and would be subject to the disadvantages of a flexible harrow. To avoid these disadvantages, while at the same time minimizing the setting up of unnecessary stresses in any of the harrow members, there is provided a novel support means which permits vertical movement of any of the intermediate tooth bars while maintaining the rotated position of the front and rear tooth bars constant with respect to the ground. This is accomplished by a telescope assembly consisting of tube 50 and a slidable rod 52. Tube 50 is pivotally secured to the foremost rocker arm 36 through a bracket 54 and pin 56. Bracket 54 is rigidly secured as by welding to tube 50. The slidable rod or telescoping member 52 is pivotally secured to the rear rocker arm 36 by a bracket 58 and pin 60. The telescoping member 52 is rigidly secured to bracket 58. The members 50 and 52 are thus free to telescope relatively to each other, to allow the end tooth bars to move closer together to permit the intermediate tooth bars to move vertically when they encounter an obstruction. It will be seen that the telescope assembly together with link 44, arm 54, handle 40, tube 50, and rod 52, constitute a substantially rigid system extending backwardly and fixed to the foremost tooth bar 10 so that said foremost tooth bar cannot rock without causing up-and-down movement of the rear end of the assembly, but which movement is impossible in view of the attachment of bracket 58 to rearmost arm 36. Therefore, foremost tooth bar 10 cannot rock on its trunnions 18, and teeth 16 are held at a fixed angle or geometric relation to the ground so long as locking portion 46 remains in any particular hole in plate 42.

In view of the connection of the several arms 36 by the links 38, which, as seen in the drawings, are of the same length as the spacings between the tooth bars 10, and the fact that all the arms 36 are of the same length, as also apparent in the drawings, any rocking of the foremost tooth bar 10, is duplicated in the next adjacent tooth bar, so that all of the tooth bars take up positions dependent on the position of the foremost tooth bar. In practice, as shown clearly in FIG. 2, the bars are so positioned when the machine is built that the teeth 16 of each bar are parallel to those of the next, and, as above outlined, with the structure shown and described, this relation is preserved regardless of the floating of the tooth bars relatively to each other, or the adjustment of foremost tooth bar 10.

The operation and assembly of the harrow can be seen from the following:

The harrow teeth are positioned relative to the ground by the handle 40 which simultaneously positions the tooth bars 10 through links 38 and rocker arms 36. The tooth bars are then locked in place by link 44 which extends through the opening 48 in plate 42. Link 44 is then fixed relatively to plate 42 by locking portion 46. The load imposed upon the teeth 16 by the ground reaction forces results in a force tending to lift the rear of the harrow off the ground as explained, and a horizontal force acting on the teeth in the opposite direction to the harrow travel. The force tending to raise the harrow is counteracted by weights 34 and the horizontal force results in only normal stresses to the structural elements of the harrow.

It will be noted that the telescoping members, being in effect fixed in relation to the foremost tooth bar, serve to maintain it in a fixed geometric relationship with the harrow as a whole, and accordingly, with the other tooth bars. In other words, the front tooth bar is fixed with its teeth at a predetermined angle relative to the plane defined by the other tooth bars, while the other tooth bars, being controlled by their arms 36 and links 38, take up the same angle relative to the plane defined by the tooth bars as the front tooth bar, and are in a fixed geometric relation to each other and to the ground. Furthermore, the links 12 and 38, on the one hand, and the arms 36 on the other being of the same length, define a series of parallelograms so that up-and-down movement of any tooth bar does not change its angular relation with the ground or with the other tooth bars. This is clearly shown in FIG. 2.

Upon encountering an obstruction the intermediate tooth bars will be moved upwardly in the manner of a flexible harrow. When this occurs the rear tooth bar will move closer to the foremost tooth bar, which movement is accommodated by telescoping of members 50 and 52, but the angular relationship between the rearmost and forwardmost tooth bars or for that matter between all the tooth bars will remain fixed, as discussed above. This then gives the effect of a rigid harrow between the first and last tooth bars while permitting the intermediate tooth bars to act as in a flexible harrow without setting up high stresses in the harrow structural members.

Thus it can be appreciated that there is provided a harrow which will function as a rigid harrow with respect to the foremost and rearmost tooth bars while allowing the intermediate tooth bars to float and follow the contour of the terrain and ride over any obstructions.

While only one embodiment of the invention has been described specifically, it will be apparent to those skilled in the art that many alterations and substitutions of mechanical equivalents may be made. For example, the harrow described is not to be limited to telescoping means, other rigid elements which may be readily varied in effective length being contemplated as within the scope of the invention, or to the specific location of the adjusting links for changing the position of the tooth bars.

What I claim as new and desire to secure by Letters Patent of the United States is:

1. In a harrow of the type having a plurality of substantially parallel tooth bars including a front tooth bar and a rear tooth bar, a plurality of teeth arranged along each of said bars, a plurality of side links interconnecting adjacent bars at the ends thereof and pivotally connected to the associated bars and to adjacent links, a rocker arm attached to each of said bars and extending upwardly therefrom, and rocker arm links interconnecting each pair of rocker arms and pivotally connected to the associated rocker arms, the improvement comprising means for maintaining the harrow substantially rigid while permitting floating movement of an intermediate tooth bar relative to an adjacent bar, said means including slidably interengaging rigid members, one of said members being secured to said front tooth bar in a manner to control rotation thereof and another of said members being secured, against up-and-down movement, to said rear tooth bar.

2. In a harrow of the type having a plurality of substantially parallel tooth bars, a plurality of side links interconnecting adjacent bars at the ends thereof and pivotally connected to the associated bars and to adjacent links, a rocker arm attached to each of said bars and extending upwardly therefrom, rocker arm links interconnecting each pair of rocker arms and pivotally connected to the associated rocker arms, and a handle secured to one of said tooth bars for adjusting the position of the tooth bars, means for maintaining the harrow substantially rigid while permitting floating of an intermediate tooth bar relatively to an adjacent bar including a first and second bracket pivotally connected to the rocker arm secured to the foremost and rearmost tooth bar respectively, interengaging telescoping members, one being rigidly secured to said first bracket and the other being rigidly secured to said second bracket, and means securing one of said brackets to its associated tooth bar in a manner to prevent rotation thereof relatively to said bracket whereby a fixed geometric relationship is maintained between the foremost and rearmost tooth bars.

3. In a harrow of the type disclosed in claim 2 wherein the telescoping members include a fixed member and a slidable member, and means securing one of said brackets to its associated tooth bar in a manner to prevent rotation thereof relatively to said bracket, the improvement in which the last mentioned means comprises a plate secured to said fixed member and a link interconnecting the handle and plate.

4. In a harrow of the type having a plurality of substantially parallel tooth bars, a plurality of side links interconnecting adjacent bars at the ends thereof and pivotally connected to the associated bars and to adjacent links, a rocker arm attached to each of said bars and extending upwardly therefrom, rocker arm links interconnecting each pair of rocker arms and pivotally connected to the associated rocker arms, and a handle secured to one of the tooth bars for adjusting the position of the tooth bars, the improvement comprising means for maintaining the harrow substantially rigid while permitting floating of an intermediate tooth bar relative to an adjacent bar, said means including slidably interengaging rigid members secured to the foremost and rearmost tooth bar, and means for maintaining the rear of the harrow in the ground including a link extending rearwardly from said rearmost tooth bar, and a counterweight secured to the last mentioned link.

5. A drag harrow comprising a plurality of spaced, toothed bars, links interconnecting adjacent bars, said bars being rotatable relative to said links, means for simultaneously turning all of said bars, means associated with said bar turning means for holding said bars at various substantially similar positions, including telescoping means interconnecting the rearmost and foremost tooth bars of said harrow constituting a substantially rigid system fixed in relation to one of said tooth bars and pivotally connected to the other tooth bar whereby said rearmost and foremost bars are maintained in a fixed geometric relationship, and counterweight means disposed adjacent and supported from said rearmost bar to maintain the harrow in the ground.

6. In a harrow of the type having a plurality of substantially parallel tooth bars, including a front tooth bar and a rear tooth bar, a plurality of teeth arranged along each of said bars, a plurality of side links interconnecting adjacent bars at the ends thereof and pivotally connected to the associated bars and to adjacent links, a rocker arm attached to each of said bars extending upwardly therefrom, and rocker arm links interconnecting each pair of rocker arms and pivotally connected to the associated rocker arms, the improvement comprising means for maintaining the harrow substantially rigid while permitting floating movement of an intermediate tooth bar relative to an adjacent bar, said means including slidably disposed interengaging rigid members, means for securing one of said members to said front tooth bar in a manner to control rotation thereof and means for securing the other member to said rear tooth bar.

7. In a drag harrow of the type having a plurality of substantially parallel transversely arranged tooth bars, teeth on said bars and a front draft connection, the combination of a plurality of longtudinally arranged links connecting adjacent tooth bars for independent rocking movement, upwardly directed arms fixed on said tooth bars, links pivotally connected with upper portions of said arms, said links and arms defining parallelogram type connections between said tooth bars whereby rocking movement of one tooth bar will be imparted in equal degree to the others, means connected with one of said tooth bars for rocking the same, a rigid member of variable length connected between the foremost and the rearmost tooth bars, pivoted in relation to one of said tooth bars, means for fixing the other tooth bar in relation to said rigid member, whereby the couple resulting from the draft force and the ground reaction will be resolved into a lifting force at the rear end of said rigid member, a counterweight, and means for applying said counterweight to the rear portion of said harrow to counteract said lifting force, whereby to maintain the rear tooth bar at predetermined working depth.

8. In a drag harrow of the type having a plurality of substantially parallel transversely arranged tooth bars, teeth on said bars and a front draft connection, the combination of a plurality of longitudinally arranged links connecting adjacent tooth bars for independent rocking movement, upwardly directed arms fixed on said tooth bars, links pivotally connected with upper portions of said arms, said links and arms defining parallelogram type connections between said tooth bars whereby rocking movement of one tooth bar will be imparted in equal degree to the others, a rigid member of variable length connected between the foremost and the rearmost tooth bars, pivoted in relation to one of said tooth bars, means for fixing the other tooth bar in relation to said rigid member, whereby the couple resulting from the draft force and the ground reaction will be resolved into a lifting force at the rear end of said rigid member, a counterweight, and means for applying said counterweight to the rear portion of said harrow to counteract said lifting force, whereby to maintain the rear tooth bar at predetermined working depth.

9. In a drag harrow of the type having a plurality of substantially parallel transversely arranged tooth bars, teeth on said bars and a front draft connection, the combination of a plurality of longitudinally arranged links connecting adjacent tooth bars for independent rocking movement, upwardly directed arms fixed on said tooth bars, links pivotally connected with upper portions of said arms, said links and arms defining parallelogram type connections between said tooth bars whereby rocking movement of one tooth bar will be imparted in equal degree to the others, means connected with one of said tooth bars for rocking the same, a rigid member of variable length connected between the foremost and the rearmost tooth bars, pivoted in relation to one of said tooth bars, and means for fixing the other tooth bar in relation to said rigid member, whereby the couple resulting from the draft force and the ground reaction will be resolved into a lifting force at the rear end of said rigid member.

10. In a drag harrow of the type having a plurality of substantially parallel transversely arranged tooth bars, teeth on said bars and a front draft connection, the combination of a plurality of longitudinally arranged links connecting adjacent tooth bars for independent rocking movement, upwardly directed arms fixed on said tooth bars, links pivotally connected with upper portions of said arms, said links and arms defining parallelogram type connections between said tooth bars whereby rocking movement of one tooth bar will be imparted in equal degree to the others, a rigid member of variable length connected between the foremost and the rearmost tooth bars, pivoted in relation to one of said tooth bars, and means for fixing the other tooth bar in relation to said rigid member, whereby the couple resulting from the draft force and the ground reaction will be resolved into a lifting force at the rear end of said rigid member.

References Cited in the file of this patent

FOREIGN PATENTS 31,896   France _____ Mar. 8, 1927
         (Addition to No. 566,765)